(12) United States Patent
Abbiati

(10) Patent No.: US 9,304,277 B2
(45) Date of Patent: Apr. 5, 2016

(54) RETENTION ASSEMBLY FOR FLEXIBLE STRENGTH MEMBERS OF AN OPTICAL CABLE

(75) Inventor: Fabio Abbiati, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 14/364,505

(22) PCT Filed: Dec. 22, 2011

(86) PCT No.: PCT/EP2011/073864
§ 371 (c)(1),
(2), (4) Date: Oct. 16, 2014

(87) PCT Pub. No.: WO2013/091716
PCT Pub. Date: Jun. 27, 2013

(65) Prior Publication Data
US 2015/0036993 A1    Feb. 5, 2015

(51) Int. Cl.
*G02B 6/00* (2006.01)
*G02B 6/44* (2006.01)

(52) U.S. Cl.
CPC ............. *G02B 6/4446* (2013.01); *G02B 6/444* (2013.01); *G02B 6/4457* (2013.01); *G02B 6/4477* (2013.01)

(58) Field of Classification Search
CPC .. G02B 6/4471; G02B 6/3825; G02B 6/4457; G02B 6/4477; G02B 23/2476; G02B 6/3887
USPC ................................. 385/134–135
See application file for complete search history.

(56) References Cited

U.S. PATENT DOCUMENTS

| | | | |
|---|---|---|---|
| 7,751,675 B2 * | 7/2010 | Holmberg et al. | ............. 385/135 |
| 2005/0169116 A1 | 7/2008 | Mullaney et al. | |
| 2008/0170832 A1 | 7/2008 | Mullaney et al. | |
| 2009/0252472 A1 * | 10/2009 | Solheid et al. | ................ 385/135 |
| 2011/0222829 A1 * | 9/2011 | Loeffelholz et al. | .......... 385/135 |
| 2011/0255837 A1 | 10/2011 | Solheid et al. | |
| 2013/0243386 A1 * | 9/2013 | Pimentel et al. | .............. 385/135 |

FOREIGN PATENT DOCUMENTS

| | | |
|---|---|---|
| CA | 2 614 937 | 1/2007 |
| WO | WO 2007/009593 | 1/2007 |
| WO | WO 2008/048935 | 4/2008 |
| WO | WO 2009/102912 | 8/2009 |

OTHER PUBLICATIONS

International Search Report from the European Patent Office for International Anplication No. PCT/EP/2011/073864, mailing date Oct. 9, 2012.

* cited by examiner

*Primary Examiner* — Ellen Kim
(74) *Attorney, Agent, or Firm* — Finnegan, Henderson, Farabow, Garrett & Dunner, L.L.P.

(57) ABSTRACT

An enclosure for housing and fastening a length of optical cable, the optical cable having an outer sheath and a flexible strength member, includes a fixing element and a retention assembly, the fixing element being adapted for engaging a portion of the outer sheath and the retention assembly being adapted for fastening the flexible strength member. The fixing element and the retention assembly are independent from each other. The retention assembly includes a reel and a reel seat. The reel is adapted to receive at least one turn of the flexible strength member wound thereon and to be inserted without rotation into the reel seat. The reel seat is adapted for housing the reel. The reel seat is shaped at least partially mating the shape of the reel.

16 Claims, 12 Drawing Sheets

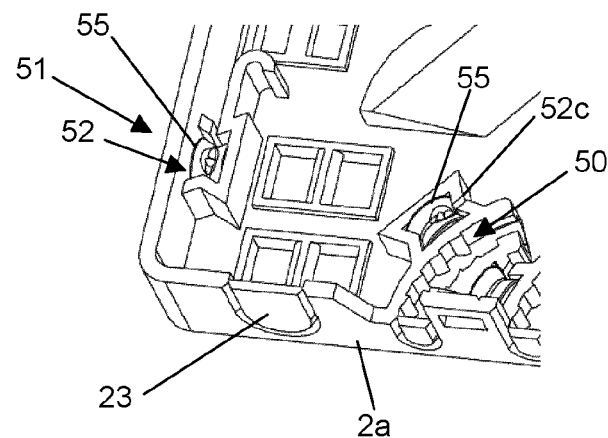
Fig. 3.1
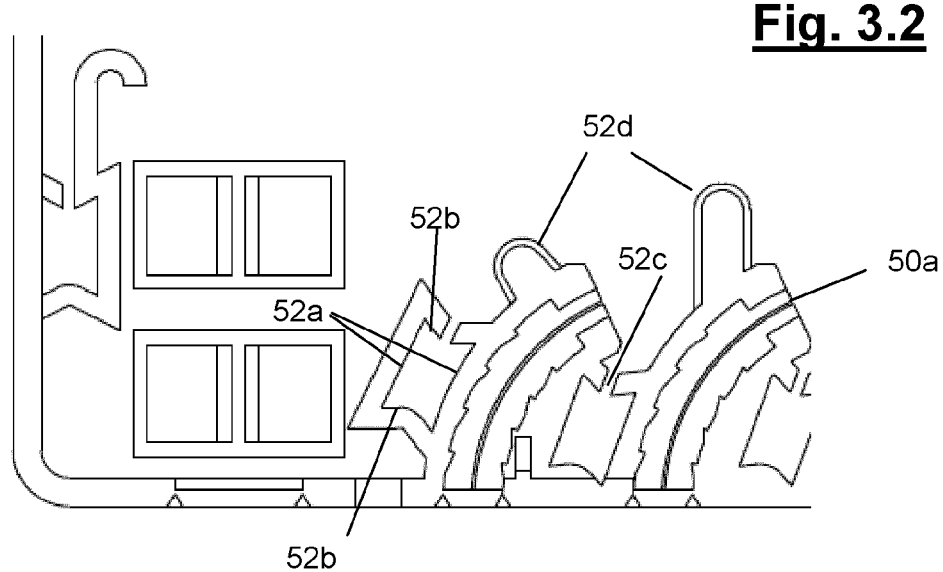
Fig. 3.2

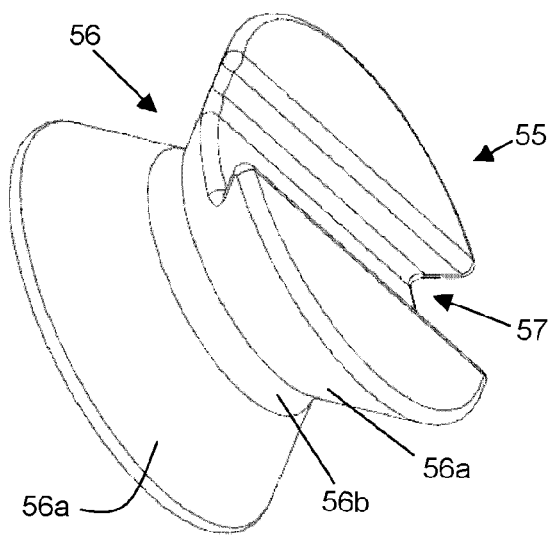
Fig. 5.1
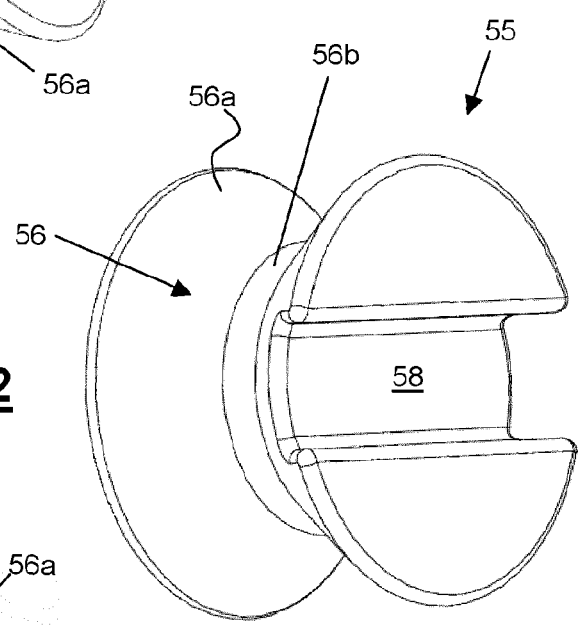
Fig. 5.2
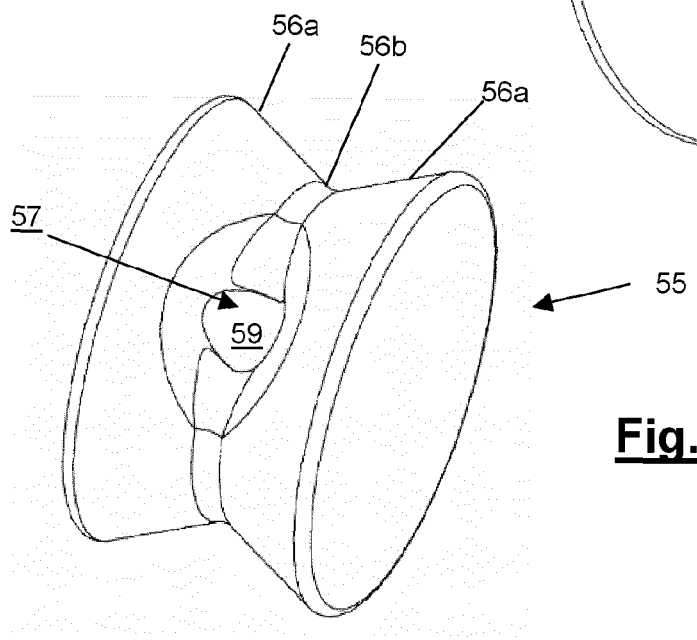
Fig. 5.3

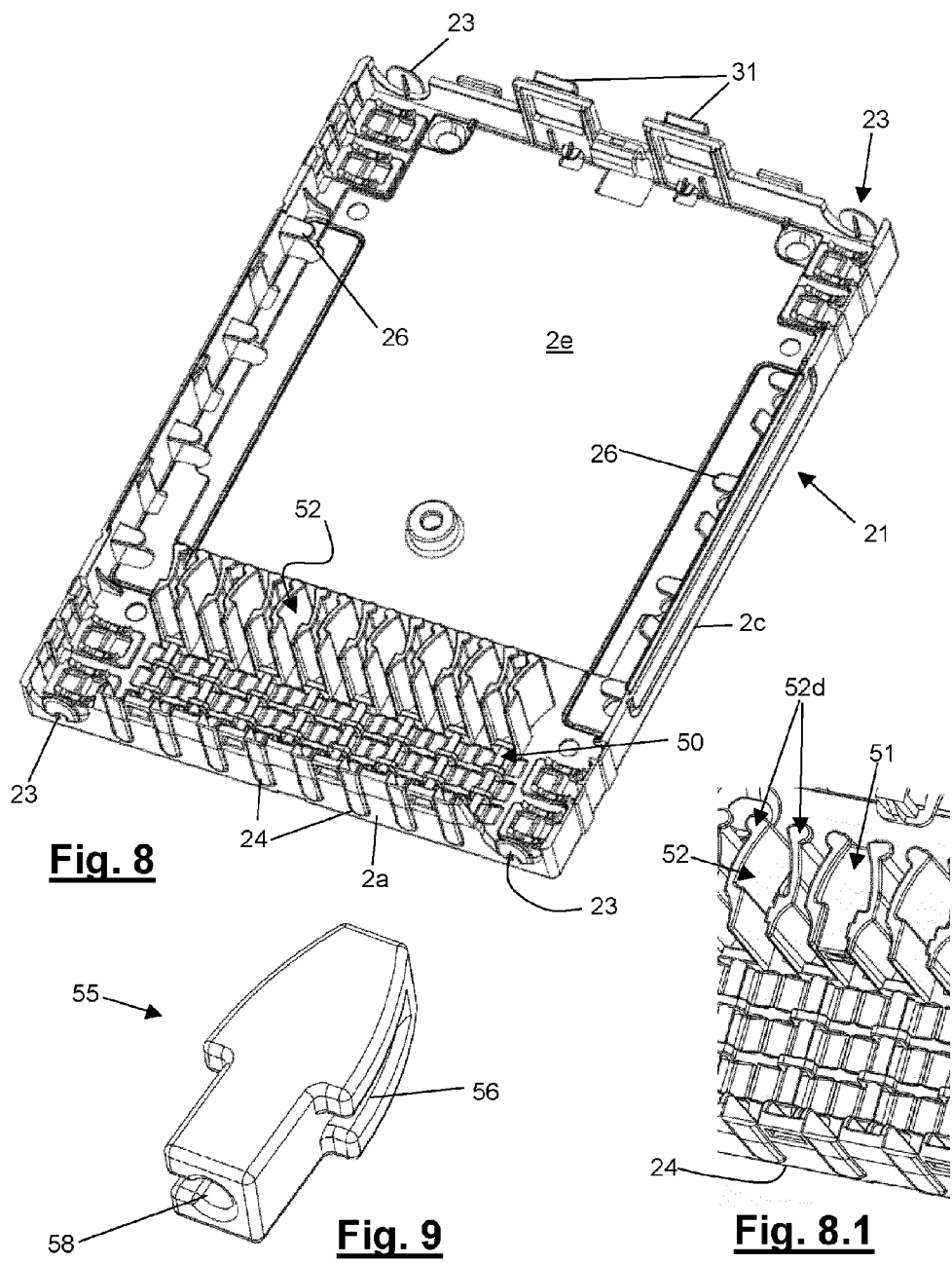

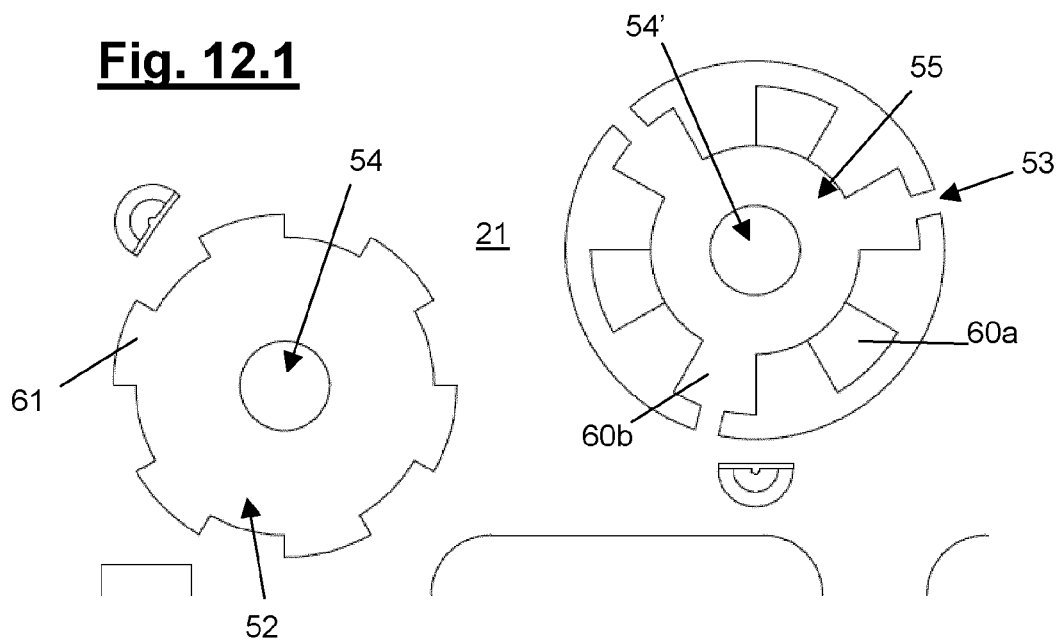
Fig. 12.1
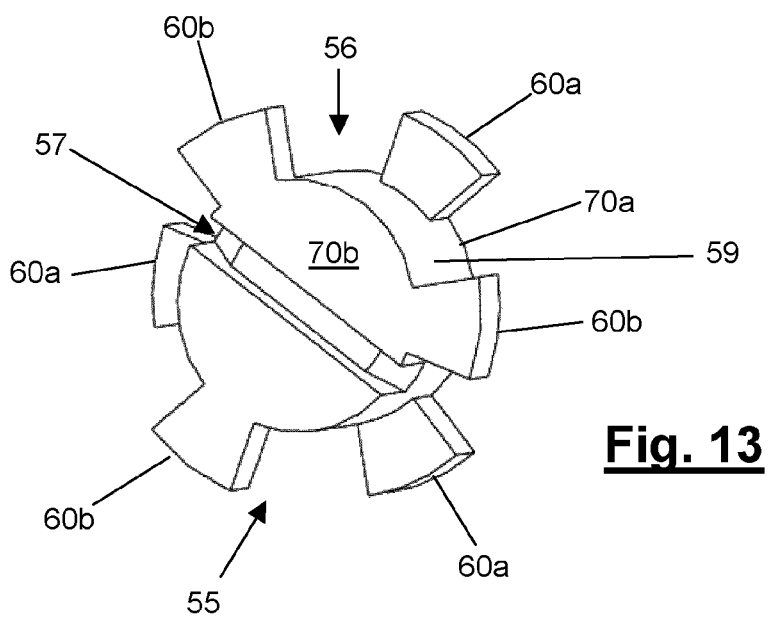
Fig. 13

RETENTION ASSEMBLY FOR FLEXIBLE STRENGTH MEMBERS OF AN OPTICAL CABLE

CROSS REFERENCE TO RELATED APPLICATION

This application is a national phase application based on PCT 1EP2011/073864 filed Dec. 22, 2011, the content of which is incorporated herein by reference.

TECHNICAL FIELD

The present invention relates to the field of apparatuses and components for the installation of optical access networks. In particular, the present invention relates to an enclosure for housing a length of optical cable and, possibly, a fiber optic splice, with a retention assembly for fastening optical cable flexible strength members of said optical cable.

BACKGROUND ART

An FTTH ("Fiber To The Home") network is an optical access network providing a number of end users with broadband communication services, i.e. with services requiring data transmission at a rate of some hundreds of Mbit/s or more.

Typically, an FTTH network comprises a distribution cabinet which cooperates with an access network and which is typically located in the basement of a building where the end users reside. An optical trunk cable, that will be termed herein after "riser cable", exits the distribution cabinet and runs through the building from the basement up to all the building floors.

At each floor of the building, the riser cable may be optically connected to one or more optical cables that will be termed herein after "drop cables". Each drop cable is typically terminated at its far end by a respective customer termination box located within or in proximity of the apartment or office of an end user.

An optical connection between a first optical fiber (e.g. an optical fiber of a riser cable) and a second optical fiber (e.g. an optical fiber of a drop cable) is generally termed splice or optical splice.

At each floor, the optical connection(s) between the riser cable and the drop cable(s) are typically arranged in a splice enclosure, for instance a floor termination box or a floor riser box.

A splice enclosure, as well as a termination box or the like, may comprise a base and a cover. The base of a splice enclosure typically has an area suitable for housing the ends of the drop cables and a path or channel suitable for housing a portion of the riser cable, so that it passes through the splice enclosure. Openings allowing the riser cable to enter and exit the riser box and allowing the ends of the drop cables to be inserted into the riser box may be provided in the sidewalls of the base.

A splice enclosure may further comprise a cable management tray and/or a splice tray designed to improve cable and splice management within the box.

U.S. Patent Publication No. 2009/0252472 discloses a fiber optic splice enclosure with a management tray including cable retention and/or securement arrangements for mechanically securing the cables to the splice enclosure.

One embodiment of U.S. Patent Publication No. 2009/0252472 teaches an anchoring screw-type fastener positioned adjacent to a respective cable retention block. Strength members (e.g., a length of aramid yarn) of one of the drop cables are shown wrapped around and anchored to the fastener, which is secured to the base of the fiber management tray by a screw driver. Anchoring the strength members to the fiber management tray by the fastener inhibits the cable from being pulled axially out from the splice enclosure.

A second embodiment of U.S. Patent Publication No. 2009/0252472 teaches cable retention blocks working in combination with compression inserts to mechanically secure the drop cables to the splice enclosure. The compression inserts define central passages that extend through the compression inserts and that are sized to receive jacketed drop cables. The compression inserts also define a plurality of strength member passages and access slots that allow strength members (e.g., aramid yarn) to be inserted into the strength member passages. Strength members from the drop cable can be grouped together, routed back through at least one of the strength member passages, and wrapped around the exterior of the plug portion prior to inserting the compression insert within its corresponding retention opening. In this manner, further retention of the drop cable is provided.

WO Patent Publication No. 2007/009593 relates to an optical waveguide distribution device with holding elements for the strain elements which are integrated in the cable sheath of an optical waveguide cable. The holding elements are integral with the base of the distribution device. The holding elements can be covered by a cap.

WO Patent Publication No. 2008/048935 relates to an optical cable retention device including a body having first and second opposing portions and a hinge disposed therebetween. The cable retention device is configured to clamp onto the jacket portion of an optical fiber cable and also secure the strength members of the optical fiber cable. Protrusions are provided about which strength members can be folded or wrapped about.

SUMMARY OF THE INVENTION

The Applicant has perceived that, disadvantageously, the screw-type fastener arrangement of a first embodiment of U.S. Patent Publication No. 2009/0252472 requires an additional tool, typically a screw driver, for anchoring the strength members to the tray. The screw-type fastener can not be secured by pressure but only by screwing and this is disadvantageous from the installation point of view.

The Applicant has also perceived that the compression inserts of a second embodiment of U.S. Patent Publication No. 2009/0252472, disadvantageously, are arranged coaxially with the cable and therefore render the cable bulky. This, in turn, disadvantageously results in an enclosure of a large size. Moreover, the compression inserts do not allow securing the strength members independently of the cable path because the compression insert is arranged coaxial with the cable. In other words, the compression insert is part of an arrangement which engages the outer sheath.

The Applicant has also perceived that the holding elements of WO Patent Publication No. 2007/009593 are integral with the base of the distribution device and are not detachable therefrom. This renders highly inconvenient the step of winding the strain elements around the holding elements which are small and arranged one close to the others.

The Applicant has also perceived that winding the strength members around the protrusions of WO Patent Publication No. 2008/048935 is inconvenient due to the fact that they are close one to the other and also because they are connected to the arrangement for retaining the optical fiber cable in the same position.

The Applicant has tackled the problem of providing an enclosure for housing and fastening an optical fiber cable which overcomes the aforesaid drawbacks. The enclosure may be, for instance, a riser box, a termination box or any enclosure wherein optical splices may be housed. The enclosure comprises a fixing element for engaging a portion of the optical cable outer sheath and a retention assembly for fastening the optical cable flexible strength member. Advantageously, the outer sheath fixing element and the flexible strength member retention assembly are independent from each other.

The Applicant has found that the problems of the prior art could be solved by a retention assembly comprising a reel adapted to receive at least one turn of the flexible strength and a reel seat adapted for housing the reel with at least one turn of the flexible strength member wound thereon. Advantageously, the reel seat is shaped at least partially mating the shape of the reel so that unwinding of the flexible strength member is prevented. More advantageously, the reel is inserted without rotation into the reel seat.

In an embodiment of the invention, the reel has a winding path for at lease one turn of flexible strength member.

Advantageously, the reel is adapted to be pressure pushed into the reel seat so as to be fixed without fastening tools. Preferably, the reel can be rendered separated from the enclosure so that the flexible strength member can be easily wound thereon to form at least one turn. Thanks to the easily winding of the strength member on the reel and to the fixing of the reel in its seat without fastening tools, the assembly operations are particularly easy and fast and are feasible even by inexperienced operators.

In an aspect of the present invention, the reel seat is laterally arranged with respect to said outer sheath fixing element.

In another aspect of the present invention, the reel is integrally formed with a base of the enclosure and in use the reel can be rendered separated from the base so that the flexible strength member can be easily wound to form at least one turn. Advantageously, the reel is connected to the bottom wall of the base by at least a connecting surface which is breakable in order to separate the reel from the enclosure.

In an aspect of the present invention, the reel comprises a transverse passage for housing the flexible strength member. In a first embodiment the transverse passage comprises a channel extending along a diameter direction. In a second embodiment the transverse passage comprises a through hole extending along a diameter direction.

In a preferred embodiment, the reel comprises a cylinder body with a lateral surface and a winding path on said lateral surface for housing one turn of flexible strength member. Advantageously, the reel seat comprises two facing planar lateral walls and two shaped walls designed to penetrate, at least partially, the winding path so that the reel is retained and the flexible strength member on the reel is prevented from unwinding. Preferably, one of the two shaped walls comprises a slit for passage of the flexible strength member.

In another preferred embodiment, the reel comprises a cylinder body with a lateral surface and spokes radially projecting from said lateral surface. Advantageously, the winding path is provided between first spokes and second spokes. Preferably, the reel seat comprises a circular seat with cavities for housing the free ends of the spokes and a stud for engaging a hole provided in said reel.

In another preferred embodiment, the reel is a harrow shaped element with a lateral surface and a winding path on at least a portion of its lateral surface. Advantageously, the harrow shaped element has a truncated end and a shank.

In another aspect of the present invention the enclosure comprises at least one flexible strength member deflecting wall for properly deflecting the flexible strength member from a longitudinal direction of the optical fiber to a direction deviating from such a direction towards a reel seat.

BRIEF DESCRIPTION OF THE DRAWINGS

The present invention will become fully clear by reading the following detailed description, given by way of example and not of limitation, to be read by referring to the accompanying drawings, wherein:

FIGS. 3.1 and 3.2 are enlarged views of a portion of FIG. 3;

FIGS. 5.1 and 5.2 are perspective views of a reel for the enclosure of FIG. 2;

FIG. 5.3 is an axonometric view of another reel for the enclosure of FIG. 2;

FIG. 8 is an axonometric view of the base of the enclosure of FIG. 6;

FIG. 8.1 is an enlarged view of a portion of FIG. 8;

FIG. 9 is an axonometric view of a reel for the enclosure of FIG. 6;

FIG. 12.1 is an enlarged plan view of a portion of FIG. 12; and

FIG. 13 is an axonometric view of a reel for the enclosure of FIG. 10.

DETAILED DESCRIPTION OF PREFERRED EMBODIMENTS OF THE INVENTION

Figure 1:
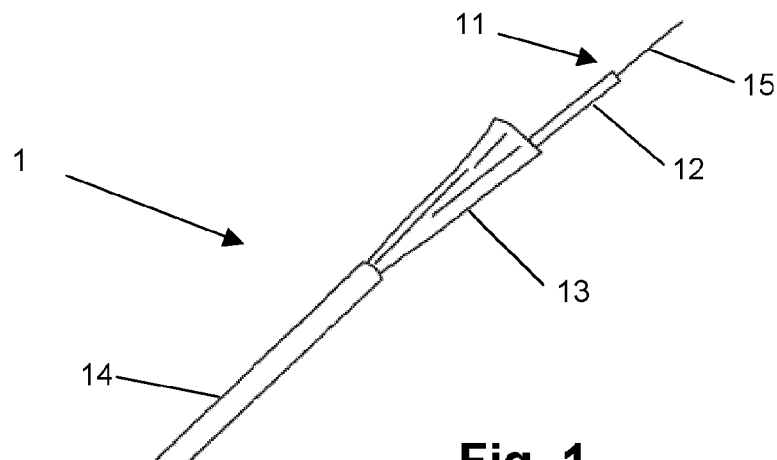
FIG. 1 is a diagrammatic representation of an optical drop cable.

FIG. 1 is a diagrammatic representation of an optical cable, for instance a drop cable. The optical cable 1 of FIG. 1 comprises an optical fibre module 11, an outer sheath 14 and a flexible strength member 13 arranged in the outer sheath 14. The optical fibre module 11 comprises a jacket 12 around a bare fibre 15. Typically, the flexible strength member 13 is a bundle of flexible yarns, for example aramidic yarns. Profitably, the aramidic yarns are arranged in a circular arrangement around the fibre optic jacket 12.

As said above, an enclosure for fiber optic splices houses a number of splices between the fiber optics of one or more riser cables and the fiber optics of a number of drop cables, or splices between the fiber optics of one or more drop cables and the fiber optics of a number of other drop cables, or splices between the fiber optics of one or more drop cables and patching cords for connective active equipment.

Figure 2:
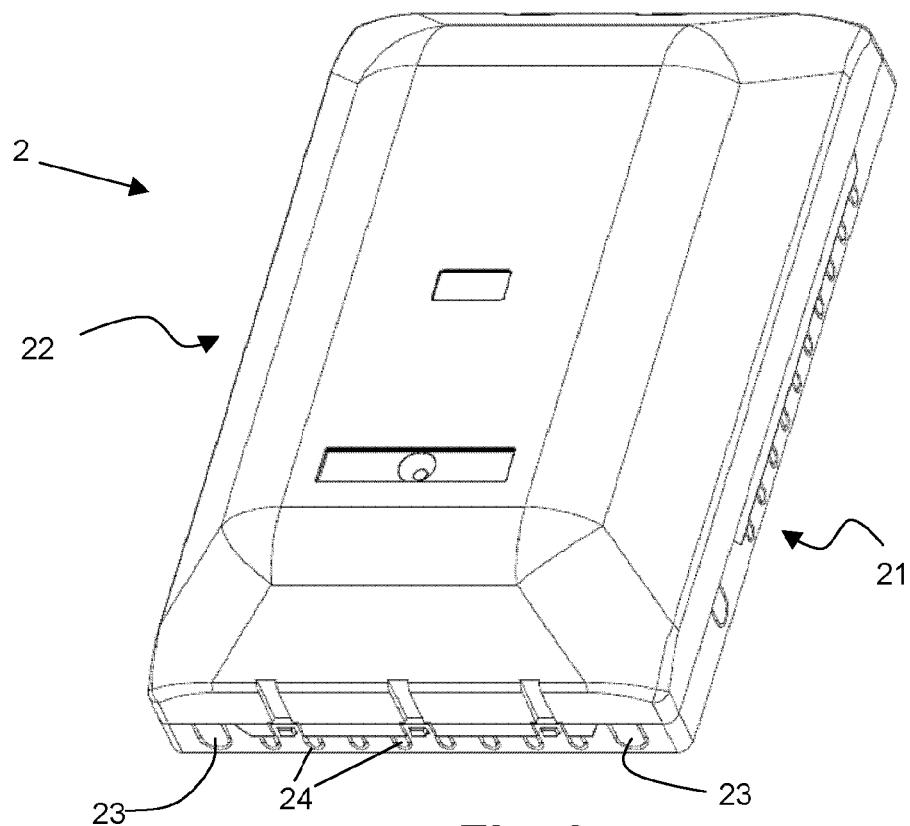
FIG. 2 is an axonometric view of an enclosure according to one embodiment of the invention, e.g. a floor termination box.

FIG. 2 shows a first embodiment of an enclosure for fiber optic splices according to the present invention. This embodiment refers for instance to a floor termination box housing one or more multi customer cables dropped to different single customer cables. The enclosure 2 may comprise a base 21 and a cover 22. The enclosure may further comprise one or more splice trays (not shown).

Figure 3:
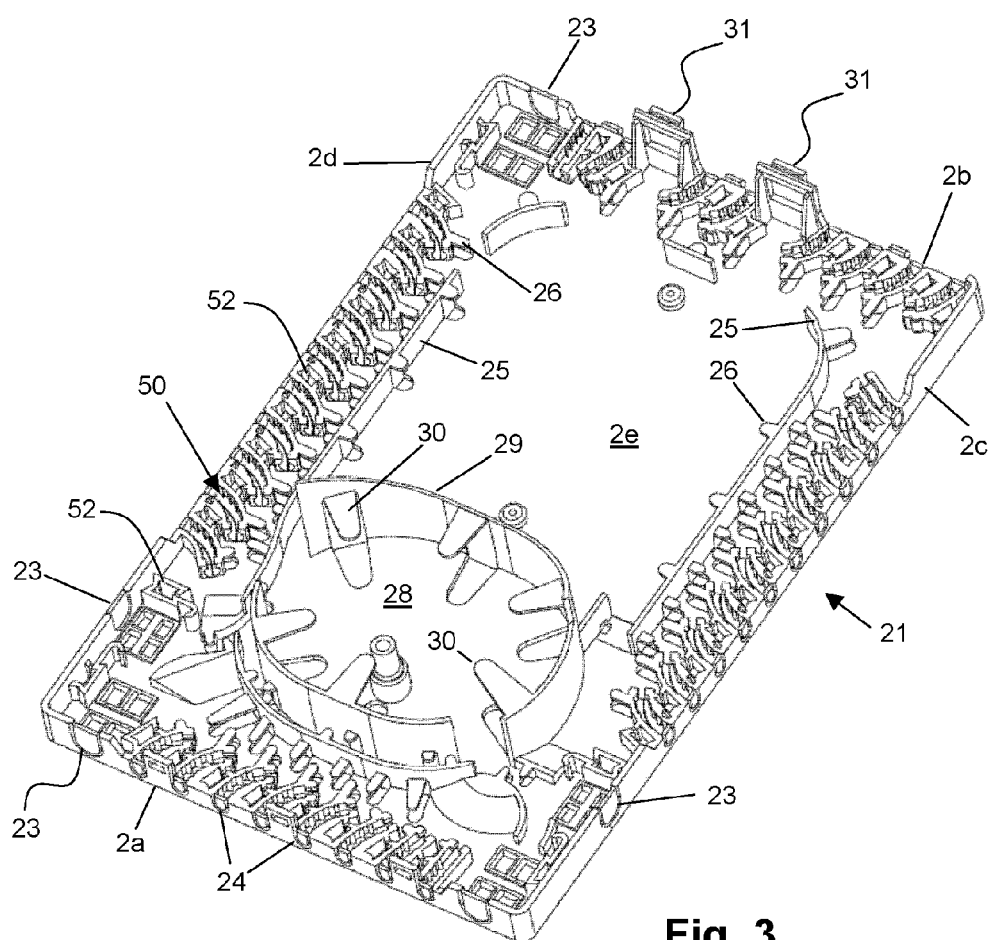
FIG. 3 is an axonometric view of the base of the enclosure of FIG. 2.
Figure 4:
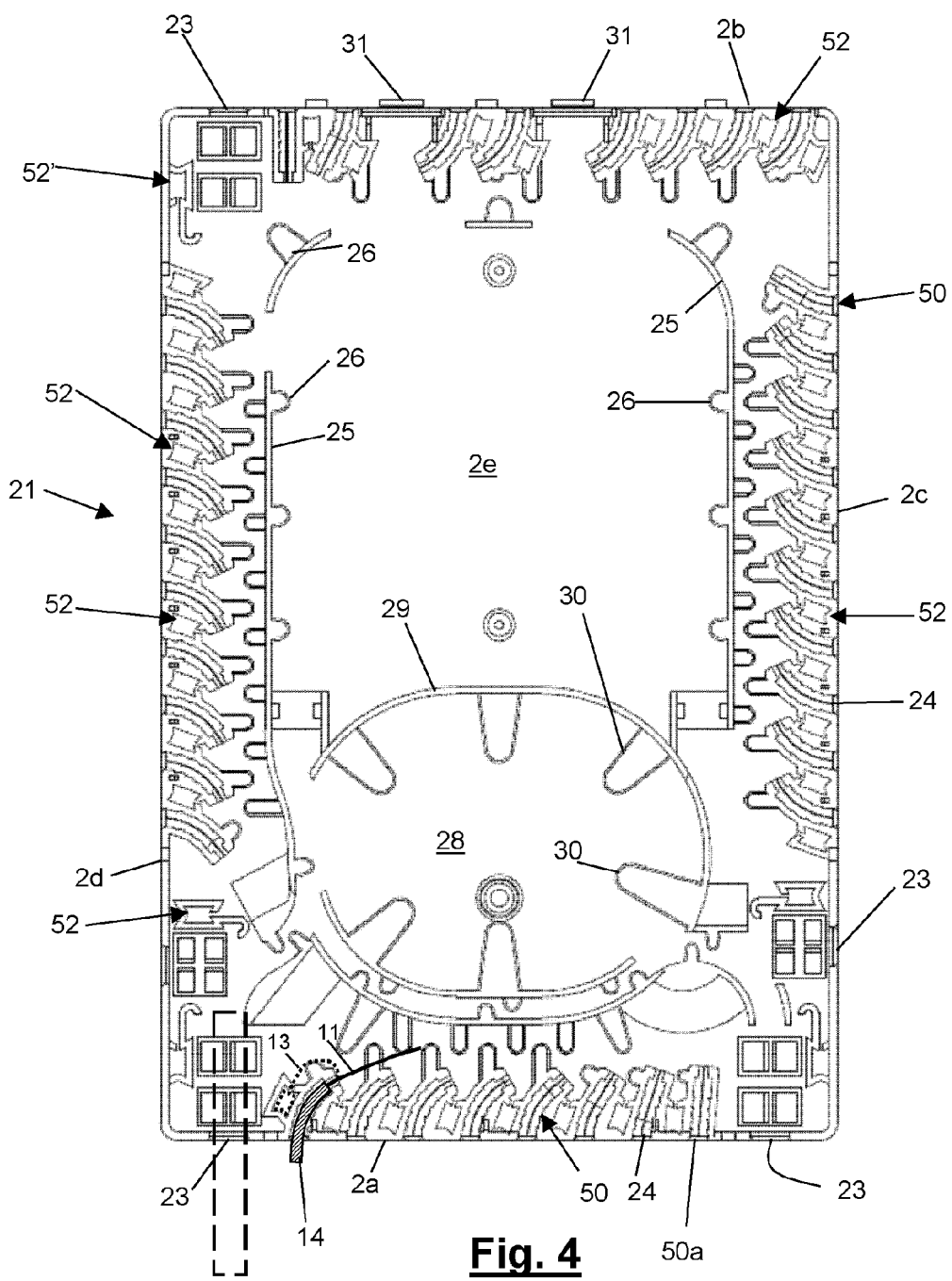
FIG. 4 is a plan view of the base of the enclosure of FIG. 2.

FIGS. 3 and 4 are an axonometric view and a plan view, respectively, of the base 21 of the enclosure 2 of FIG. 2. The enclosure base 21 of FIGS. 2 and 3 comprises a bottom 2e and four sidewalls 2a, 2b, 2c, 2d. Preferably, the bottom 2e is substantially rectangular. The sidewalls 2a, 2b, 2c, 2d are substantially perpendicular to the bottom 2e.

One sidewall (front sidewall 2a) of the base 21 comprises first cable openings 23. A length of a first optical cable, e.g. a multi customer cable, is shown with a dotted line in FIG. 4. Further first cable openings 23 are provided on the other sidewalls 2b, 2c, 2d of the base. A number of second cable openings 24 are provided on each of the sidewalls of the base 21. In particular, eight second cable openings 24 are provided on the front sidewall 2a, between the two first cable openings 23; eight second cable openings 24 are provided on the opposite sidewall 2b; and ten second cable openings 24 are provided on each of the other sidewalls 2c, 2d. A short length of a second cable, e.g. a single customer cable, is schematically shown in FIG. 4 with a fibre optic jacket 14, an optical fiber 11 and a flexible strength member 13.

Through a first cable opening 23 a first optical cable can enter the enclosure 2. The first optical cable typically comprises a number of optical fibers. At least one optical fiber of the first cable is connected to a corresponding optical fiber of a second optical cable. The junction between two optical fibers is termed splice.

The base 21 of the enclosure 2 is designed for properly managing the first cable(s) and the second cables. In particular, there are provided routing vertical walls 25 and holding projecting tabs 26. The projecting tabs 26 are substantially horizontally arranged and project from the vertical walls 25. The projecting tabs are at a distance from the base bottom wall 2e. In this manner, a cable may be forced to follow a certain path defined by the vertical walls 25 and may be vertically retained between the bottom wall 2e of the enclosure base 21 and the projecting tabs 26.

Profitably, the base 21 of the enclosure is an integrally molded piece made of a thermoplastic material. The thermoplastic material preferably comprises an ABS (Acrylonitrile butadiene styrene) polymer. Preferably, the bottom wall 2e of the base is open in correspondence of the projecting tabs 26 due to the need to create a passage for a molding element when the base 21 is molded.

Centrally, a central mandrel 28 is provided for housing excess fiber (not shown) of the optical cables. The central mandrel 28 is made with a curved vertical wall 29 provided with horizontal projecting tabs 30 at a distance from the base bottom wall. The projecting tabs 30 of the central mandrel 28 are substantially centrally directed. The excess fiber lengths may thus be arranged in the central area delimited by the curved vertical wall 29 and by the projecting tabs 30.

Inside the enclosure several further elements projecting upwardly from the base bottom wall may be provided. In particular, there are provided fixing elements 50 for providing a first blocking of the optical cables. Preferably, the fixing elements 50 are integrally formed with the base 21. Such a first blocking is provided, in the embodiment of FIGS. 2, 3 and 4, by a curved or straight channel 50 having knurled walls (see FIG. 3.1). The knurled walls may be made with projecting relieves. The projecting relieves of one channel wall extend towards the other projecting relieves of the opposite channel wall. The width of the channel is therefore reduced at the projecting relieves so as to provide a cable sheath clamping. The channel is provided with a stop wall for impeding that the optical cable further enters the enclosure.

However, any other known means for clamping the sheath of a cable and retain it in position can be used.

In addition, further projecting elements could be provided for arranging the optical fibers in a designed manner. Also, latch means 31 or the like could be provided for latching the base 21 to the cover 22. Such further projecting elements and latch means will not be described in detail because they do not directly relate to the invention.

In addition to the above cable sheath fixing element 50, a retention assembly 51 for retaining an optical cable flexible strength member 13 is provided. As seen in FIGS. 3, 3.1, 3.2 and 4, there is provided a number of reel seats 52 in the base 21 and corresponding reels 55 (shown in FIGS. 5.1, 5.2 and 5.3) to be inserted into such reel seats 52. The reel seats 52 are integrally formed with the base 21 and the reels 55 are distinct from the base 21. Preferably, the retention assembly 51 is realized by push fitting the reel 55 into the reel seat 52.

Preferably, each second cable opening 24 is provided with a retention assembly 51 (namely, with a reel seat 52 and a reel 55). Preferably, the reel seat 52 is provided at a position deviating from the path of the optical fiber of the optical cable. Preferably, the reel seat 52 is provided at a lateral position with respect to the channel of the fixing element 50 for blocking the optical cables.

In one embodiment of the invention, the reel 55 has a cylinder body with a lateral surface and comprises a winding path 56 on its lateral surface. The winding path 56 may be in the form of a "V" shaped race as shown in FIGS. 5.1, 5.2 and 5.3. The depth of the "V" shaped race is adapted to house at least one turn of a flexible strength member 13 of one optical cable 1.

Preferably, the depth of the "V" shaped race is adapted to house several turns/loops of a flexible strength member 13 of one optical cable 1. In one embodiment, the diameter of the reel 55 is about 7 mm and the depth of the race is about 1.5 mm measured at the center of the race. The race could be "V" shaped or "U" shaped or a combination thereof (inclined converging walls 56a and a plane bottom wall 56b connecting the lower ends of the inclined converging walls 56a).

In one embodiment of the invention, the reel 55 is provided with a transverse passage 57 extending in a substantially diameter direction. The transverse passage 57 is adapted to house at least one flexible strength member 13 of an optical cable 1. Preferably, the depth of the transverse passage 57 is adapted to house a flexible strength member 13 of an optical cable 1.

In the embodiment of FIGS. 5.1 and 5.2 the transverse passage 57 is a slit 58 which could be on a single face of the reel 55 or on both the faces of the reel 55. The depth of the slit is adapted to house at least one flexible strength member 13 of an optical cable 1. Preferably, the depth of the slit 58 is adapted to house at least one turn of a flexible strength member 13 of an optical cable 1.

Due to the fact that the reel 55 of the present invention is a separate part from the base 21, a flexible strength member 13 could be easily wound on the reel 55 and the wound reel could be then forced into the corresponding reel seat 52. When the wound reel 55 is forced into a corresponding properly shaped reel seat 52, the winding of flexible strength member could not become unwounded.

Preferably, the tail length of the flexible strength member is housed in the transverse passage 57 and then the remaining length of the flexible strength member is wound on the winding path 56 to form one or more tight loops. Preferably, the one or more loops are arranged on the tail of the flexible strength member so that the tail of the flexible strength member becomes blocked by the tight loops.

In an alternative arrangement, the flexible strength member is first wound on the winding path 56 to form one or more tight loops. The remaining length of the flexible strength member is then introduced into the transverse passage 57.

As shown in FIG. 3.2, the reel seat 52 is preferably a housing with a bottom wall, two facing substantially planar sidewalls 52*a* and two facing properly shaped walls 52*b*. The housing is open at the top for allowing the reel 55 to be inserted. The shape of the two facing properly shaped walls 52*b* mates the winding path 56 of the reel 55. Therefore, the two shaped walls 52*b* are preferably "V" or "U" shaped. One of said two shaped walls 52*b* is provided with a slit 52*c* for allowing the flexible strength member to pass through.

In case an optical cable is pulled in a direction out of the enclosure 2, the optical cable will remain retained by the above disclosed fixing element 50 for blocking the sheath cable and by the retention assembly 51. The wound reel is retained in the reel seat. The two shaped walls 52*b* of the reel seat 52 press the loops of the flexible strength members. In addition, even if a big pulling force is applied on the flexible strength member, the reel 55 will only rotate for a limited degree up to the configuration wherein the transverse passage 57 is arranged horizontally. A further pulling force will result in no further rotation of the reel 55 because the further pulling force will be applied only along a diameter direction.

As it is better shown in FIG. 3.2, preferably, for each reel seat 52 there is provided a flexible strength member deflecting wall 52*d* for properly deflecting the flexible strength member from a longitudinal direction of the optical fiber to a direction deviating from such a direction towards the reel seat 52.

FIG. 5.3 shows a further embodiment of reel 55 adapted to cooperate with the reel seats 52 of FIGS. 3 and 4. In the embodiment of FIGS. 5.3 the transverse passage 57 is a through hole 59 extending in a diameter direction. Preferably, the opening of the through hole 59 is beveled for a better introduction of the flexible strength member therein.

The through hole 59 has a function similar to the function of the slit 57. Preferably, the tail length of the flexible strength member is inserted in the through hole 59 and then the remaining length of the flexible strength member is wound on the winding path 56 to form one or more tight loops. Preferably, the one or more loops are arranged on the tail of the flexible strength member so that the tail of the flexible strength member becomes blocked by the tight loops.

Figure 6:
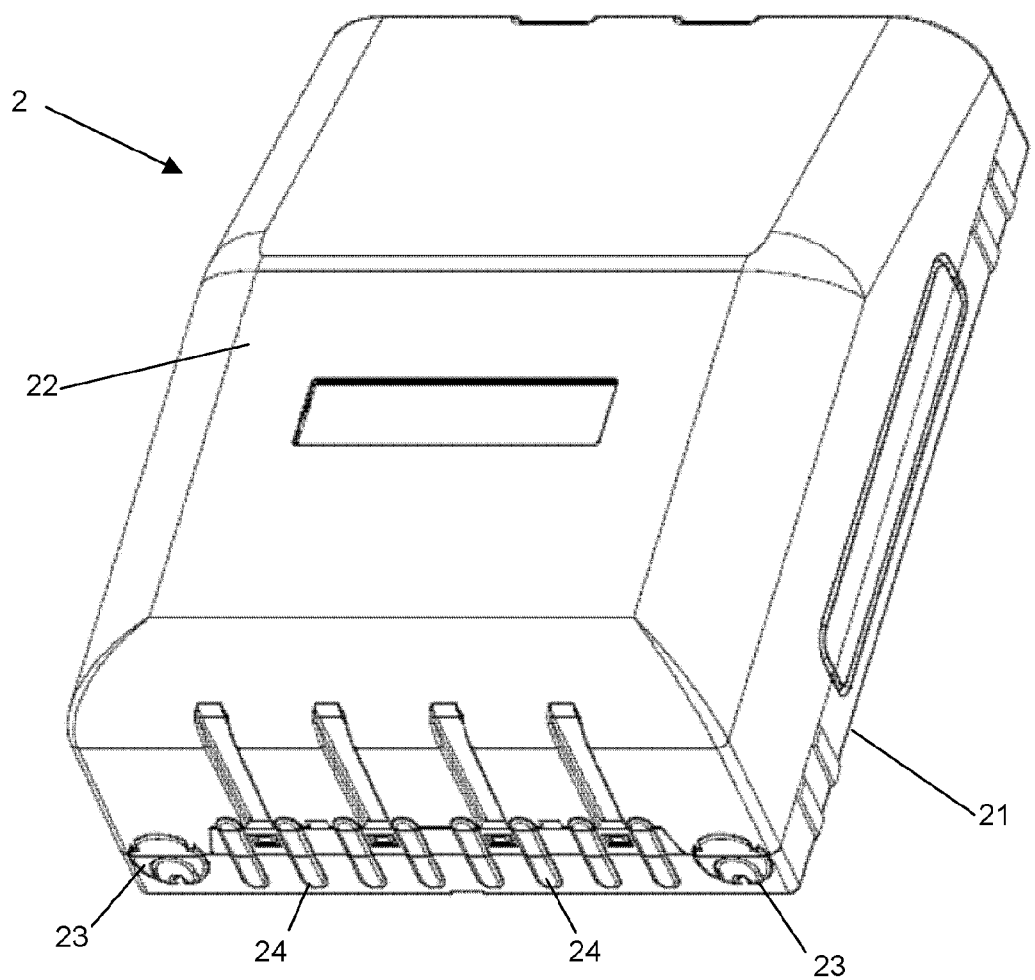
FIG. 6 is an axonometric view of an enclosure according to another embodiment of the invention, e.g. a floor riser box.
Figure 7:
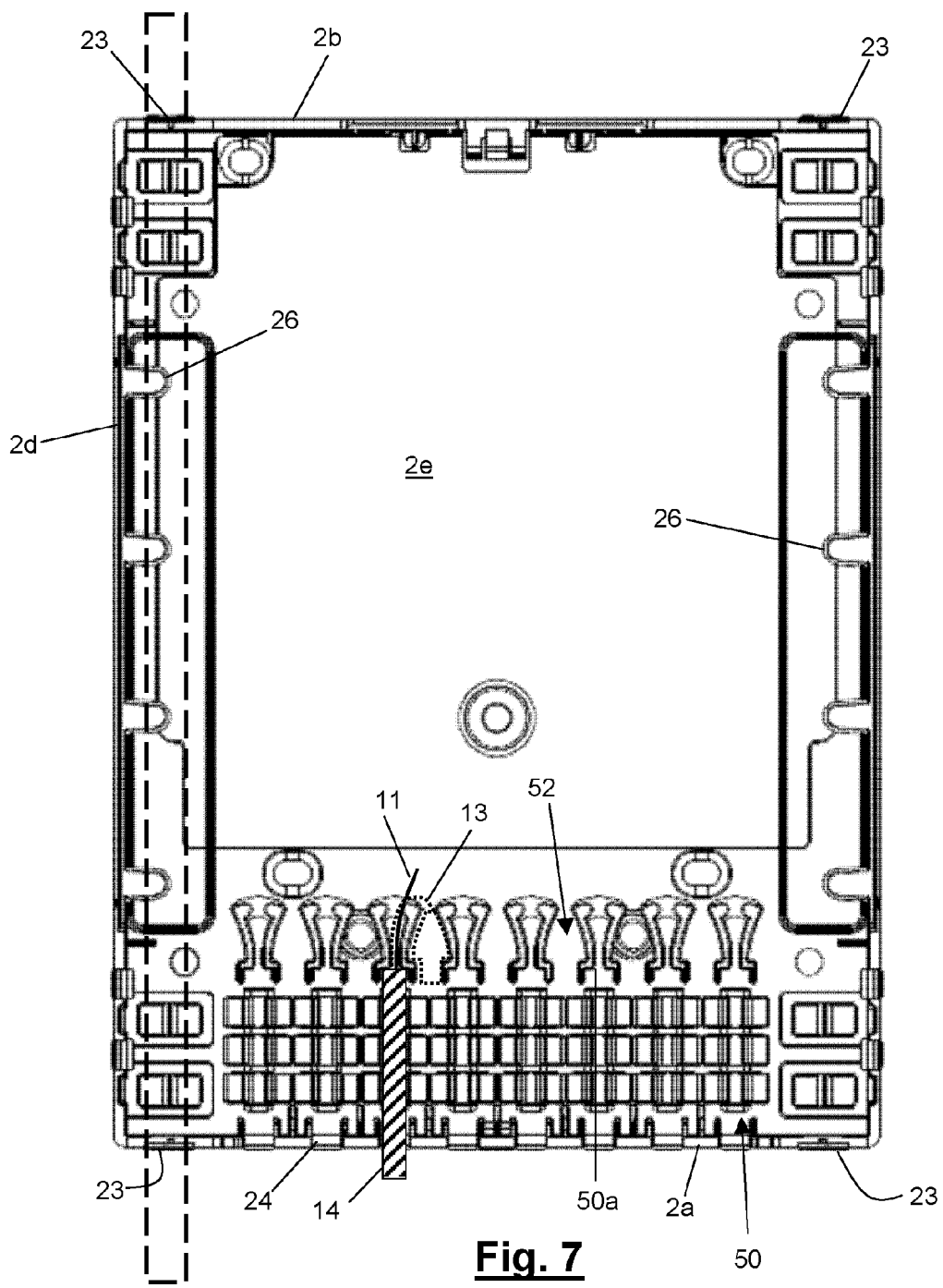
FIG. 7 is a plan view of the base of the enclosure of FIG. 6.

FIG. 6 shows a further embodiment of enclosure 2 of the present invention. This embodiment refers for instance to a floor riser box for housing a number of splices between the fiber optics of one or more trunk cables and the fiber optics of a number of drop cables. FIGS. 7 and 8 show the base 21 of the enclosure of the present invention. While the shape of the cover 22 and the base 21 of the enclosure of FIGS. 6, 7, 8 and 8.1 is different from the shape of the cover and the base of the enclosure of the first embodiment, similar elements are present.

One front sidewall 2*a* of the base 21 comprises two first cable openings 23. The opposite sidewall 2*b* of the base 21 also comprises two corresponding first cable openings 23. A number of second cable openings 24 are provided on the front sidewall 2*a*. In particular, eight second cable openings 24 are provided on the front sidewall 2*a*, between the two first cable openings 23. A first optical cable, e.g. a trunk cable can enter the enclosure 2 through the two front first openings 23 and can exit through the corresponding opposite first cable openings 23. Therefore, the trunk cable can follow a linear path along a sidewall 2*c*, 2*d* of the enclosure base 21. Several splices (not shown) may be housed in the enclosure.

The trunk cable is shown by dotted lines in FIG. 7. Also in FIG. 7 a short length of a second optical cable, e.g. a drop cable, is shown.

Profitably, the base 21 of the enclosure is an integrally molded piece made of a thermoplastic material. The thermoplastic material preferably comprises an ABS (Acrylonitrile butadiene styrene) polymer.

Preferably, there are provided fixing elements 50 for providing a first blocking of the drop cables. Preferably, the fixing elements 50 are integrally formed with the base 21. Such a fixing element is provided, in the embodiment of FIGS. 6, 7 and 8, by a seat having openings for allowing the passage of fastening elements (e.g. plastic bands) so as to realize a cable sheath clamping. The seat is provided with a stop wall for impeding that the optical cable further enters the enclosure.

In addition, further projecting elements could be provided for arranging the optical fibers in a designed manner. Also, latch means 31 or the like could be provided for latching the base 21 to the cover 22. Such further projecting elements and latch means will not be described in detail because they do not directly relate to the invention.

In addition to the above cable sheath blocking fixing element 50, a retention assembly 51 for retaining optical cable flexible strength members is provided. As seen in FIGS. 8, 8.1 and 9, there is provided a number of reel seats 52 in the base 21 and corresponding reels 55 (shown in FIG. 9) to be inserted into such reel seats 52. Preferably, each drop cable opening 24 is associated with a fixing element 50 for blocking the drop cables (as disclosed above, for instance) and with a reel seat 52. Preferably, the reel seat 52 is provided at a position deviating from the path of the optical fiber of the drop cable. Preferably, the reel seat 52 is provided at a lateral position with respect to the fixing element 50 for blocking the drop cables.

As it is better shown in FIG. 8.1, preferably, for each reel seat 52 there is provided a flexible strength member deflecting wall 52*d* for properly deflecting the flexible strength member from a longitudinal direction of the optical fiber to a direction deviating from such a direction towards the reel seat 52.

In one embodiment of the invention (FIG. 9), the reel 55 is a properly shaped element configured for engaging a seat which is correspondingly shaped. Thanks to the mating shape between the reel 55 and the seat, rotation of the reel is prevented when the reel is inserted into the seat. The reel of FIG. 9 is a harrow shaped element which is provided with a winding path 56 on at least a portion of its lateral surface. The harrow shaped element has a truncated end and a shank. The winding path 56 may be in the form of a "V" or "U" shaped race 56. The depth of the "V" or "U" shaped race 56 is adapted to house at least one turn of a flexible strength member 13 of one drop cable 1. Preferably, the depth of the "V" or "U" shaped race is adapted to house several turns/loops of a flexible strength member 13 of one drop cable 1.

Due to the fact that the reel 55 of the present invention is a separate part from the base 21, a flexible strength member 13 could be easily wound on the reel 55 and the wound reel could be then forced into the corresponding reel seat 52. When the wound reel 55 is forced into a corresponding properly shaped reel seat 52, the flexible strength member wound on it could not become unwounded.

The "V" or "U" shaped race is provided with a hole 58 so that a pulling direction on the flexible strength member, if any, will be in a substantially longitudinal direction of the harrow reel 55.

Figure 10:
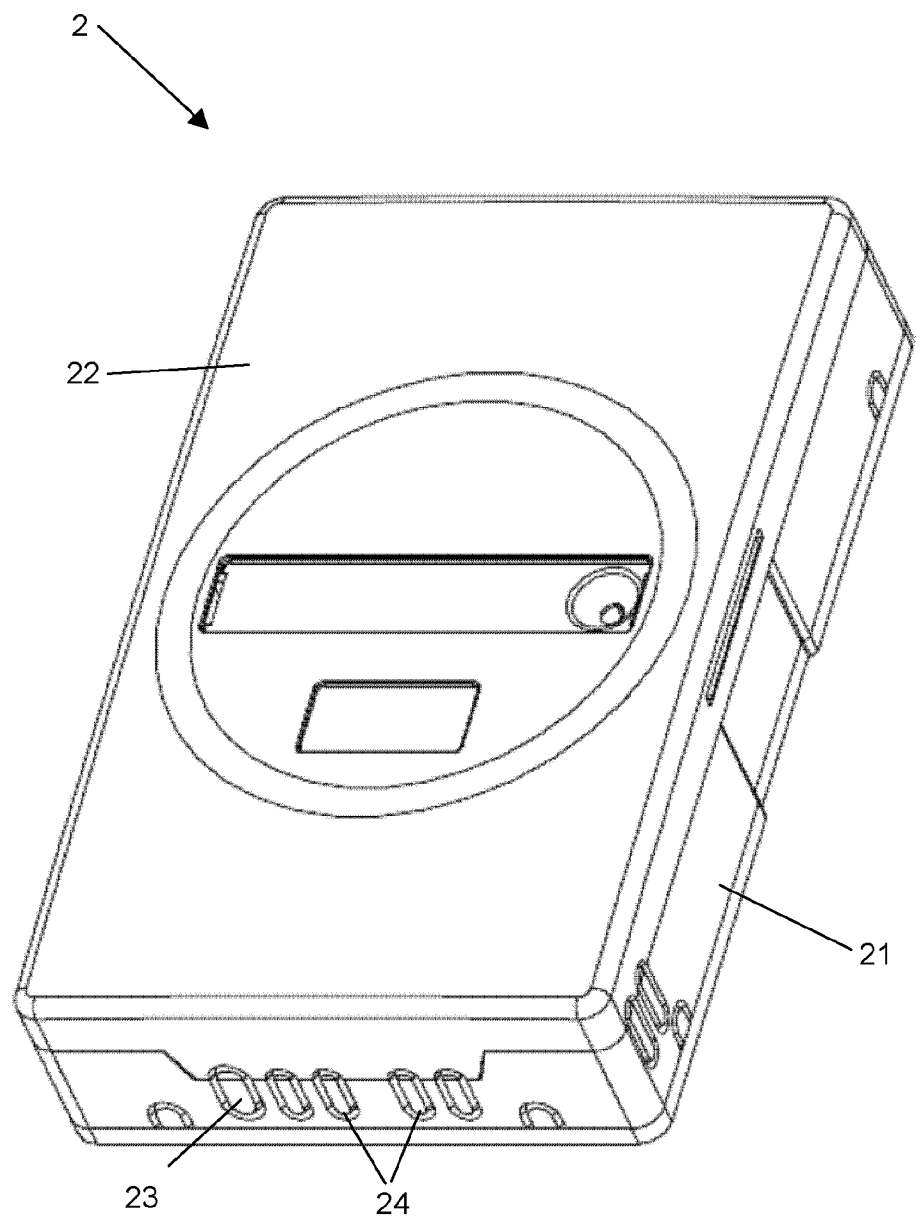
FIG. 10 is an axonometric view of an enclosure according to another embodiment of the invention, e.g. a customer termination box.

FIG. 10 shows a further embodiment of an enclosure for fiber optic splices according to the present invention. This embodiment refers for instance to a customer termination box for housing a number of splices between the fiber optics of a drop cable and patching cords for connective active equipment. In FIG. 10 only the base 21 is shown but it should be clear that the enclosure could further comprise a cover and one or more splice trays (not shown).

Figure 11:
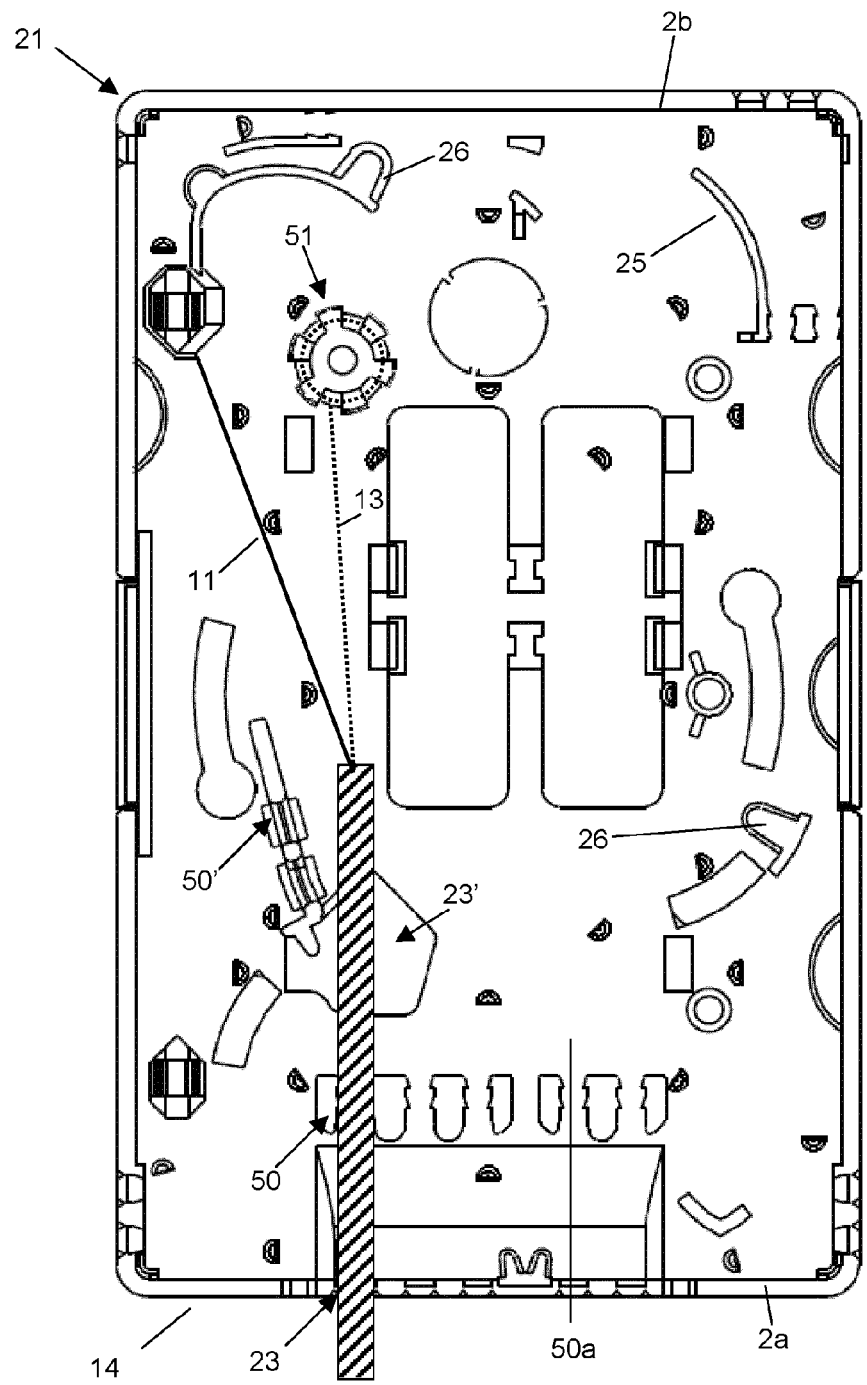
FIG. 11 is a plan view of the base of the enclosure of FIG. 10.

Also in the base 21 of FIG. 10 there are provided first openings 23 and 23' for a first optical cable, e.g. a drop cable, and second openings 24 for second optical cables, e.g. patching cords. Several splices (not shown) may be housed in the enclosure 2. In FIG. 11 a short length of drop cable is shown.

The base 21 of the enclosure is designed for properly routing the optical cables. In particular, there are provided routing vertical walls 25 and holding projecting tabs 26. The projecting tabs 26 are substantially horizontally arranged and project from the vertical walls 25. The projecting tabs 26 are at a distance from the base bottom wall 2e. In this manner, a cable may be forced to follow a certain path defined by the vertical walls 25 and may be vertically retained between the base bottom wall 2e of the enclosure and the projecting tabs 26.

Profitably, the base of the enclosure is an integrally molded piece made of a thermoplastic material. The thermoplastic material preferably comprises an ABS (Acrylonitrile butadiene styrene) polymer.

Inside the enclosure, several further elements projecting upwardly from the base may be provided. In particular, there are provided fixing elements 50 for providing a first blocking of the drop cable. Preferably, the fixing elements 50 are integrally formed with the base 21. Such a first blocking is provided, in the embodiment of FIG. 10, by a channel 50 having knurled walls. The knurled walls may be made with projecting relieves. The projecting relieves of one channel wall extend towards the other projecting relieves of the opposite channel wall. The width of the channel is therefore reduced at the projecting relieves.

However, any other known means for clipping the sheath of a drop cable and retain it in position can be used. In another embodiment, such a fixing element is provided by a shoulder 50' having openings for allowing the passage of fastening elements (e.g. plastic bands) so as to realize a cable sheath clamping.

In addition, further projecting elements could be provided for arranging the optical fibers in a designed manner. Also, latch means 31 or the like could be provided for latching the base to the cover. Such further projecting elements and latch means will not be described in detail because they do not directly relate to the invention.

In addition to the above cable sheath fixing element 50, a retention assembly 51 for retaining an optical cable flexible strength member is provided. The retention assembly 51 may comprise a (single) reel 55 and a reel seat 52 for housing such a (single) reel 55.

Figure 12:
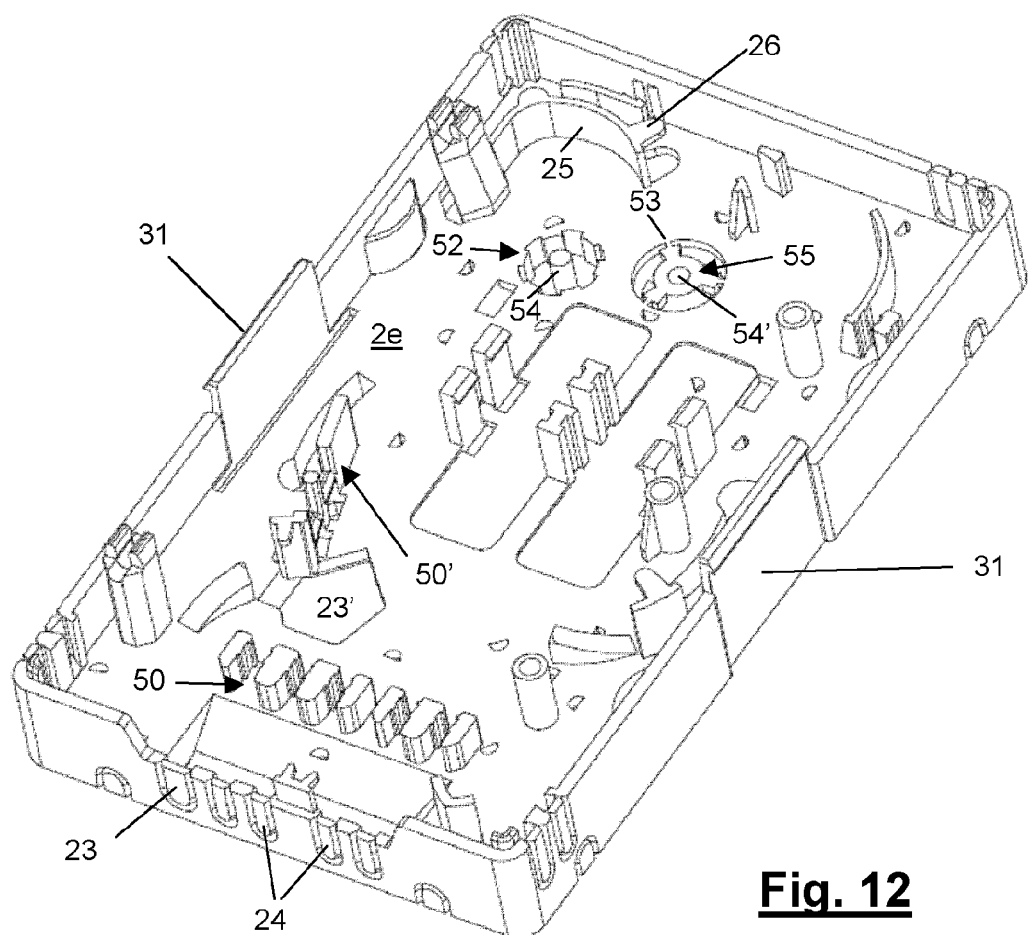
FIG. 12 is an axonometric view of the base of the enclosure of FIG. 10.

In the embodiment shown in FIG. 10 the reel 55 is molded together with the base (as shown in FIG. 12) but it is separable therefrom in order to become a completely separated member and to be inserted in the reel seat 52 (as shown in FIG. 11).

As shown in FIG. 13, the reel 55 has a cylinder body with a lateral surface 70 and a plurality of spokes 60 projecting outwardly from the lateral surface 70. Preferably, there are provided two sets of spokes, the first set of spokes (designated as 60a) are close to a first base 70a of the reel 55 and the second set of spokes (designated as 60b) are close to a second base 70b of the reel 55. Therefore, a winding path 56 is provided between the spokes of the first and second sets 60a,  60b. The depth of the winding path 56 is adapted to house at least one flexible strength member of a drop cable 1. Preferably, the depth of the winding passage 56 is adapted to house a flexible strength member 13 of a drop cable 1.

In the shown embodiment, the first set of spokes 60a comprises three spokes and the second set of spokes 60b also comprises three spokes. Preferably, the spokes 60a of the first set are staggered with respect to the spokes 60b of the second set of spokes.

A single spoke may be shaped as a portion of a circular surface. The cylinder body may have a diameter of about 8 mm while the diameter of a circumference of the spokes may be of about 12.

Preferably, as shown in the embodiment of FIG. 13, there is provided a transverse passage 57 extending in a substantially diameter direction. The transverse passage could be on a single face of the reel (the face 70b of the embodiment of FIG. 13) or on both the faces of the reel 55. The depth of the transverse passage 57 is adapted to house at least one flexible strength member of a drop cable 1. Preferably, the depth of the transverse passage 57 is adapted to house a flexible strength member 13 of a drop cable 1. In the embodiment of FIG. 13, the base 70a, opposite to the base 70b with the transverse passage 57, is provided with a central hole 54' (FIG. 12).

The reel 55 of FIG. 13 could be a completely separate part from the base 21. As an alternative, the reel 55 could be made with the base 21 (FIG. 12) and it could be separated therefrom when it should be used for winding up a flexible strength member (FIG. 11). In FIGS. 12 and 12.1, the reel 55 is shown connected to the base 21, before separating it. The connection between the base 21 and the reel 55 could be through at least one connecting surface 53. Preferably, three thin connecting surfaces 53 could be provided at each of the spokes 60a of the first set of spokes (FIG. 12.1). For separating the reel 55 from the base 21, the reel 55 could be pressed down/up with respect to the base 21. This pressure will result in a break of the thin connecting surfaces 53 and in a complete separation of the reel 55 from the base 21. This arrangement where the reel 55 is connected to the base 21 and is separable therefrom is deemed to be advantageous because there is no risk to loose the reel. In other words, when the reel 55 should be wound up with a flexible strength member, it is simply separated from the base 21. Another advantage of this solution is that the reel 55 is molded with the base 21 without the need to have two separate moldings, one for the base and one for the reel.

In the base of FIGS. 12 and 12.1 a reel seat 52 is provided. The reel seat 52 is substantially circular but it comprises a number of lateral wall cavities 61 for the free ends of the spokes. Therefore, the diameter of the reel seat is smaller than the diameter of the free ends of the spokes because the free ends of the spokes are housed in the cavities 61 which provide a larger diameter. In the embodiment of FIG. 12.1, six lateral wall cavities 61 are provided at a regular distance. In addition a central stud 54 could be provided for centering the reel 55 in the reel seat 52. The stud 54 is designed for engaging the hole 54' of the reel.

Due to the fact that the reel 55 of the present invention is (or may become) a separate part from the base 21, a flexible strength member could be easily wound on the reel and the wound reel could be then forced into the corresponding reel seat. When the wound reel is forced into a corresponding properly shaped reel seat, the flexible strength member wound on it could not become unwounded. Preferably, the end length of the flexible strength member is first housed in the transverse passage and then another length of the flexible strength member is wound on the winding path to form one or more tight loops. Preferably, the one or more loops are arranged on the tail of the flexible strength member so that the tail of the flexible strength member becomes blocked by the tight loops.

In an alternative arrangement, the flexible strength member is first wound on the winding path to form one or more tight loops. The remaining length of flexible strength member is then introduced into the transverse passage.

Finally, the reel wound with a number of loops of the flexible strength member is push inserted into the reel seat and is blocked against rotation.

Preferably, a single reel could be used for winding up a number of flexible strength members.

Advantageously, the present invention provides an enclosure that is less bulky than the prior art arrangements also in view of the fact that the reel is made as a separate part, or can be rendered separated, from the enclosure and also from the outer sheath fixing element. In addition, the wound reel can be simply pushed into the corresponding seat without using any tool (screwdrivers or the like).

The invention claimed is:

1. An enclosure for housing and fastening a length of optical cable, said optical cable having an outer sheath and a flexible strength member, comprising a fixing element and a retention assembly, said fixing element being adapted for engaging a portion of the outer sheath and said retention assembly being adapted for fastening said flexible strength member, wherein said fixing element and said retention assembly are independent from each other, wherein said retention assembly comprises a reel and a reel seat, said reel being adapted to receive at least one turn of the flexible strength member wound thereon and to be inserted without rotation into the reel seat, and said reel seat being adapted for housing the reel, wherein said reel seat is shaped at least partially mating the shape of the reel, wherein said reel has a winding path for at least one turn of the flexible strength member, wherein said reel is adapted to be pressure pushed into the reel seat, and wherein the reel can be rendered separated from the enclosure.

2. The enclosure of claim 1, wherein said reel seat is laterally arranged with respect to said outer sheath fixing element.

3. The enclosure of claim 1, further comprising a base and wherein the reel is integrally formed with the base and can be separated from said base.

4. The enclosure of claim 3, wherein said reel is connected to a bottom wall of said base by at least a connecting surface which is breakable in order to render said reel a separated element from said enclosure.

5. The enclosure of claim 1, wherein said reel comprises a transverse passage for housing said flexible strength member.

6. The enclosure of claim 5, wherein said transverse passage comprises a channel extending along a diameter direction.

7. The enclosure of claim 5, wherein said transverse passage comprises a through hole extending along a diameter direction.

8. The enclosure of claim 1, wherein said reel comprises a cylinder body with a lateral surface and comprising a winding path on said lateral surface for said flexible strength member.

9. The enclosure of claim 8, wherein said reel seat comprises two facing planar lateral walls and two shaped walls designed to penetrate, at least partially, said path so that the reel is retained and the flexible strength member on the reel is prevented from unwinding.

10. The enclosure of claim 9, wherein one of said two shaped walls comprises a slit for passage of said flexible strength member.

11. The enclosure of claim 1, wherein said reel comprises a cylinder body with a lateral surface and spokes radially projecting from said lateral surface, wherein said winding path is provided between first spokes and second spokes.

12. The enclosure of claim 11, wherein said reel seat comprises a circular seat with cavities for housing the free ends of the spokes.

13. The enclosure of claim 12, wherein said reel seat comprises a stud for engaging a hole of said reel.

14. The enclosure of claim 1, wherein said reel is a harrow-shaped element with a lateral surface and comprising a winding path on at least a portion of a lateral surface thereof.

15. The enclosure of claim 14, wherein the harrow-shaped element has a truncated end and a shank.

16. The enclosure of claim 1, further comprising at least one flexible strength member deflecting wall for properly deflecting the flexible strength member from a longitudinal direction of an optical fiber to a direction deviating from such a direction toward a reel seat.

* * * * *